United States Patent
Singh et al.

(10) Patent No.: US 12,168,332 B2
(45) Date of Patent: Dec. 17, 2024

(54) SAMPLING OF BI-LAYER TABLETS

(71) Applicants: Scitech Centre, Mumbai (IN); ACG Pam Pharma Technologies PVT. LTD., Mumbai (IN)

(72) Inventors: Karan Singh, Mumbai (IN); Amulya Kumar Pati, Mumbai (IN)

(73) Assignees: Scitech Centre, Mumbai (IN); ACG Pam Pharma Technologies PVT. LTD., Mumbai (IN)

( * ) Notice: Subject to any disclaimer, the term of this patent is extended or adjusted under 35 U.S.C. 154(b) by 300 days.

(21) Appl. No.: 17/633,420

(22) PCT Filed: Aug. 7, 2020

(86) PCT No.: PCT/IN2020/050697
§ 371 (c)(1),
(2) Date: Feb. 7, 2022

(87) PCT Pub. No.: WO2021/024276
PCT Pub. Date: Feb. 11, 2021

(65) Prior Publication Data
US 2022/0281199 A1    Sep. 8, 2022

(30) Foreign Application Priority Data
Aug. 7, 2019  (IN) .............................. 201921032047

(51) Int. Cl.
*B30B 11/00* (2006.01)
*B30B 11/34* (2006.01)
*G01N 1/04* (2006.01)

(52) U.S. Cl.
CPC ............ *B30B 11/005* (2013.01); *B30B 11/34* (2013.01); *G01N 1/04* (2013.01)

(58) Field of Classification Search
None
See application file for complete search history.

(56) References Cited

U.S. PATENT DOCUMENTS 3,483,831 A    12/1969  Fujii et al.
5,322,655 A *  6/1994  Ebey ...................... B29C 43/58
                                                 264/40.5
(Continued)

FOREIGN PATENT DOCUMENTS

EP    2 021 168 B1 *  2/2016

OTHER PUBLICATIONS

International Search Report dated Dec. 12, 2020 in PCT/IN2020/050697.

*Primary Examiner* — Mohammad M Ameen
(74) *Attorney, Agent, or Firm* — Melissa M. Hayworth; E. Joseph Gess; Merchant & Gould, P.C.

(57) ABSTRACT

A method for sampling both layers of a bi-layer tablet, comprising forming a first layer of a first pharmaceutical powder of the bi-layer tablet in a tablet press machine, performing weight compensation for forming a second layer of a second pharmaceutical powder of the bi-layer tablet based at least on the formed first layer, performing height compensation for forming the second layer of the second pharmaceutical powder of the bi-layer tablet based at least on the formed first layer, and forming the second layer of the bi-layer tablet based on the performed height compensation and weight compensation, in the tablet press machine, for individually sampling both the first and second layers of the bi-layer tablet.

8 Claims, 4 Drawing Sheets

(56) References Cited

U.S. PATENT DOCUMENTS

| | | |
|---|---|---|
| 6,866,493 B2 | 3/2005 | Trebbi et al. |
| 2010/0038808 A1* | 2/2010 | Vogeleer ............... B30B 11/005 |
| | | 425/148 |
| 2017/0197375 A1* | 7/2017 | Brosse ............... C11D 17/0078 |

* cited by examiner

SAMPLING OF BI-LAYER TABLETS

RELATED APPLICATIONS

The present application is a U.S. National Stage filing under 35 U.S.C. § 371 of International Application No. PCT/IN2020/050697 filed Aug. 7, 2020, which claims priority to Indian application Ser. No. 201921032047 filed Aug. 7, 2019.

TECHNICAL FIELD

The present invention relates to sampling of bi-layer tablets.

BACKGROUND

Manufacturing of solid oral dosage forms such as tablets involves pharmaceutical powder/formulation being fed in dosage quantities through different feeders into a tablet press machine wherein the pharmaceutical powder is compressed to produce tablets of a desired weight and dosage.

Most tablet press machines typically comprise an assembly of different components for volumetric feeding of one or more pharmaceutical powders in a plurality of tablet pressing dies in the machine, adjusting the quantity of the pharmaceutical powder being fed based on the required weight and dosage of the tablet, scrapping the excess pharmaceutical powder, preventing spillage of the pharmaceutical powder from the dies, compressing the pharmaceutical powder, ejecting the tablet formed by the compression and sampling of the tablets for in-process quality control checking and pharmacopoeia compliance with the required weight, hardness, thickness and other quality parameters.

Sampling of a tablet involves measuring the weight of the tablet to check for the dosage, checking the uniformity of the tablet, hardness of the tablet, binding of the pharmaceutical powder, etc. Conventionally, sampling of tablets having two pharmaceutical powders, referred to as bi-layer tablets, is carried out by weighing only a first layer of each tablet. In a batch of bi-layer tablets, the tablets with only the first layer are ejected out of the tablet press machine and the weight of the first layer of each tablet is checked while the weight of a second layer of each tablet is calculated by deducting the first layer weight from the average weight of all the bi-layer tablets.

However, such conventional method for sampling the tablets by calculating the weight of the second layer of the tablets is inaccurate as it involves taking into consideration two different parameters viz. the weight of the first layer of individual tablets and the average weight of all the bi-layer tablets. Moreover, a major drawback of such conventional method for sampling tablets is that the weight of the second layer of the tablets is not checked, rather, only an assumption is made about the second layer weight through the calculation, consequently leading to more inaccuracies in the sampling. Another drawback of such conventional method is that the tablets with only the first layer, when ejected from the tablet press machine may have soft binding and loose powder particles which leads to sprinkling of the loosely bounded powder and layer mixing.

There is therefore felt for an invention which overcomes the drawbacks and inaccuracies associated with conventional bi-layer tablet sampling methods and enables accurate sampling of each layer of bi-layer tablets.

SUMMARY

This summary is provided to introduce concepts of the present invention. This summary is neither intended to identify essential features of the present invention nor is it intended for use in determining or limiting the scope of the present invention.

In accordance with an aspect of the present invention, there is provided a method for sampling both layers of a bi-layer tablet. The method comprises forming a first layer of a first pharmaceutical powder of the bi-layer tablet in a tablet press machine, performing weight compensation for forming a second layer of a second pharmaceutical powder of the bi-layer tablet based at least on the formed first layer, performing height compensation for forming the second layer of the second pharmaceutical powder of the bi-layer tablet based at least on the formed first layer, and forming the second layer of the bi-layer tablet based on the performed height compensation and weight compensation, in the tablet press machine, for individually sampling both the first and second layers of the bi-layer tablet.

In accordance with another aspect of the present invention, there is provided a system for sampling both layers of a bi-layer tablet. The system is configured to operate the tablet press machine to form a first layer of a first pharmaceutical powder of the bi-layer tablet in the tablet press machine; perform weight compensation to form a second layer of a second pharmaceutical powder of the bi-layer tablet based on at least the formed first layer, and further perform height compensation to form the second layer of the second pharmaceutical powder of the bi-layer tablet based at least on the formed first layer; and operate the tablet press machine to form the second layer of the bi-layer tablet based on the performed height compensation and weight compensation, in the tablet press machine, for individually sampling both the first and second layers of the bi-layer tablet.

BRIEF DESCRIPTION OF ACCOMPANYING DRAWINGS

The detailed description is described with reference to the accompanying figures. In the figures, the left-most digit(s) of a reference number identifies the figure in which the reference number first appears. The same numbers are used throughout the drawings to reference like features and units.

It should be appreciated by those skilled in the art that any diagrams herein represent conceptual views of illustrative methods embodying the principles of the present invention. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

In the present invention, the various embodiments describe about sampling methodology for both layers of bi-layer tablets.

In the following description, for purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

However, the invention is not limited to the specific embodiments described herein. Further, structures and devices shown in the figures are illustrative of exemplary embodiments of the present invention and are meant to avoid obscuring of the present invention.

It should be noted that the description merely illustrates the principles of the present invention. It will thus be appreciated that those skilled in the art will be able to devise various arrangements that, although not explicitly described herein, embody the principles of the present invention. Furthermore, all examples recited herein are principally intended expressly to be only for explanatory purposes to help the reader in understanding the principles of the invention and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
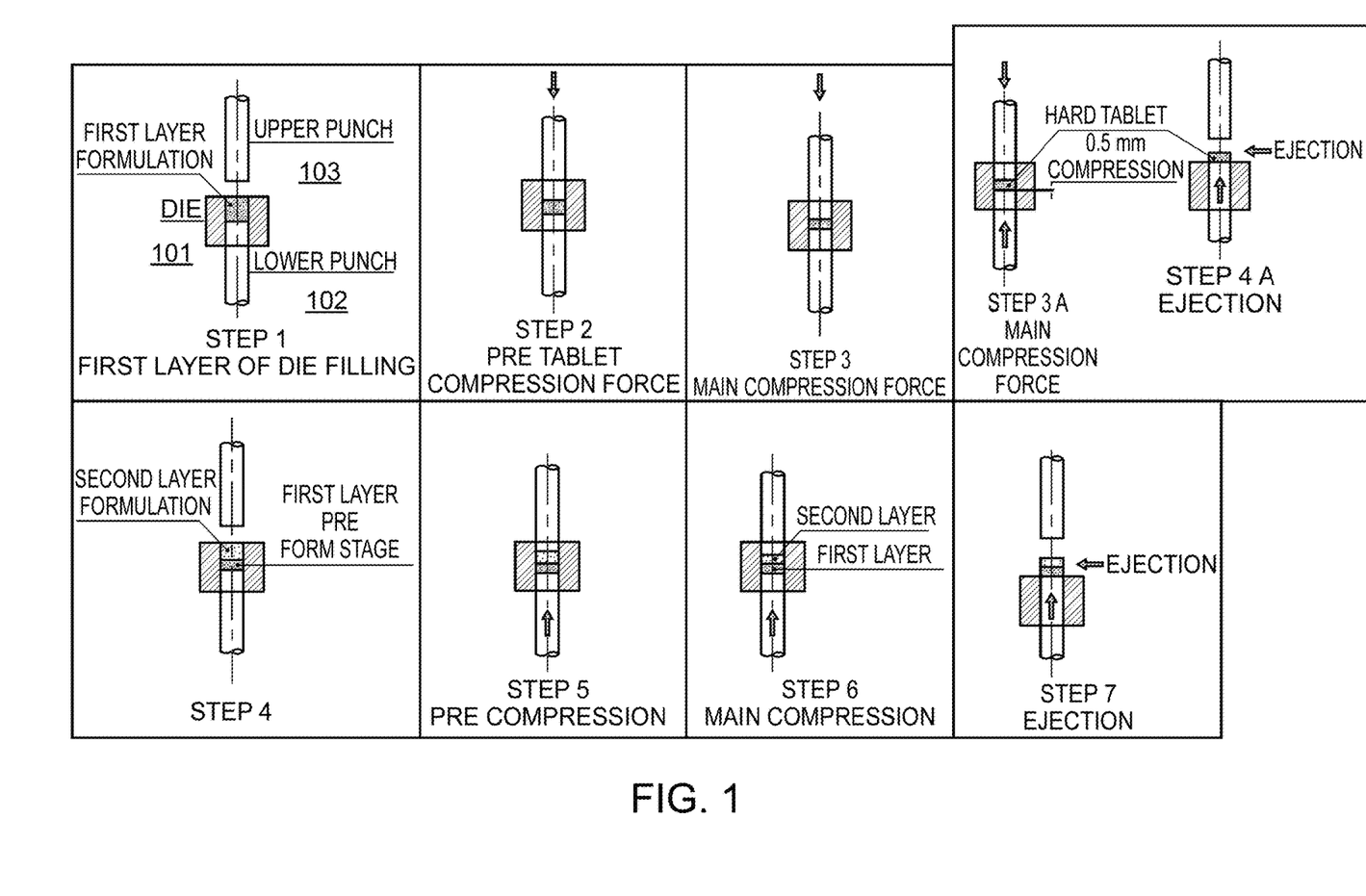
FIG. 1 illustrates schematic diagrams depicting the conventional sampling of bi-layer tablets.

A tablet press machine typically comprises a circular shaped rotary turret comprising a plurality of tablet pressing dies circumferentially mounted therein. Referring to FIG. 1, each die (101) comprises a through-hole and a punch is inserted therein from a bottom side of the die, also commonly known as lower punch (102). In tablet making process, a pharmaceutical powder from a feeder is fed in each the through-hole of each die by volumetric feeding. The turret first rotates through a fill cam which allows the lower punch (102) inserted in the through-hole from the bottom side of the die (101) to slide down in the through-hole thereby facilitating the filling of the powder in the through-hole. The lower punch does not completely slide out which prevents the power from escaping out of the die [refer step 1 of FIG. 1].

The turret then rotates through a weight adjustment portion (not particularly shown) of the turret. Here, based on the desired weight and dosage of the tablet, weight adjustment of the powder is carried out by slightly pushing the lower punch in the upwards direction in the die to spill out the excess powder from the die. The lower punch is pushed upwards typically by a weight adjustment cam which is a servo motor driven mechanism (not particularly shown).

As the turret rotates further, a scrapper scraps the excess powder and diverts it into a reservoir in the turret, also known as recirculation band for its recirculation or removal, and a 'tail-over-die' lid covers the top surface of the die to prevent further escalation of the powder due to centrifugal force acting on the die and the powder in the through-hole, as a result of the rotary action of the die. At the same time, the lower punch slides down slightly, typically by 2-3 mm, in the through-hole to bring down the powder in the through-hole of the die and create space for insertion of upper punches therein based on a required punch penetration & subsequently maintaining a final tablet cylindrical height.

The turret then rotates through a pre-compression portion, wherein an upper punch (103) is pushed downwards in the through-hole of each die (101) by an upper pre-compression roller (not particularly shown) and the lower punch in the through-hole in each die is also pushed upwards by a bottom/lower pre-compression roller (not particularly shown) to pre-compress the powder [refer step 2 of FIG. 1].

Thereafter, the turret rotates through a main-compression portion, wherein an upper main-compression roller (not particularly shown) pushes the upper punch (103) further down in the through-hole in each die (101) and a bottom/lower main-compression roller (not particularly shown) pushes the lower punch (102) further upwards in the through-hole to fully compress (i.e. tamping) the powder and create a tablet of the required final tablet cylindrical height in each die (101) [refer step 3 of FIG. 1].

Finally, the turret rotates through the ejection portion, wherein the upper punch completely withdraws from the die and an ejection cam which is a ramp structure below the turret slides the lower punch up in the through-hole thereby pushing the tablet out of the through-hole. Thereafter, the turret rotates through a take-off plate which deflects the tablet towards a collection container placed below the machine. The take-off plate is typically integrally connected to a discharge chute which comprises different channels formed therein and multiple flaps which are activated to open/close the different channels. In case of bad tablets or tablets not complying with the quality parameters, a rejection flap in the discharge chute is activated or swung from its close position to open position to deflect the tablets through a rejection channel in the discharge chute into a rejection container. Similarly, in case of good tablets, a good collection flap is activated or swung from its close position to its open position to deflect the tablets through a good tablet collection channel in the discharge chute into the collection container. Additionally, the take-off plate also includes a plurality of holes which are located facing the tablets that are being pushed out of the dies. These holes are used for pneumatic ejection of the tablets during operation. Air is blown by a pneumatic cylinder through the holes which directly hits the tablets and blows the tablets through the rejection channel in the discharge chute into the rejection container.

In most tablet-press machines, a set of feeder, fill cam, weight adjustment cam/servo motor mechanism, scrapper with 'tail-over-die' lid, compression means such as upper & lower pre-compression rollers and upper & lower main-compression rollers, ejection cam, take-off plate and discharge chute, and pneumatic ejection assembly are typically mounted about a first-half side of the rotary turret, i.e. about the first 180 degree semi-circular side of the circular shaped turret.

Similarly, another set of feeder, fill cam, weight adjustment cam/servo motor mechanism, scrapper with 'tail-over-die' lid, compression means such as upper & lower pre-compression rollers and upper & lower main compression rollers, ejection cam, take-off plate and discharge chute, and pneumatic ejection assembly are mounted about a second-half side of the rotary turret, i.e. about the second 180 degree semi-circular side of the circular shaped turret.

Accordingly, for manufacturing monolayer tablets from one pharmaceutical powder, only one-half side of the turret is utilized. However, for manufacturing bi-layer tablets from two different pharmaceutical powders, both the half-sides of the turret are utilized, wherein a first layer of the tablets is formed in the first-half 180 degree semi-circular side of the turret and a second layer of the tablets is formed in the second-half 180 degree semi-circular side of the turret. Throughout the specification the terms first layer and first layer tablet are used interchangeably, and similarly the terms second layer and second layer tablet are used interchangeably.

In bi-layer tablet manufacturing, ramp structure type ejection cam used during manufacturing of monolayer tablets in the first-half side of the turret is removed and the pneumatic ejection assembly operated by the pneumatic cylinder is added to eject the first layer tablets if required for sampling. After the main-compression of a first pharmaceutical powder which forms the first layer of the tablets in the first-half side, a second pharmaceutical powder is filled in the through-hole in each die through another feeder in the second-half side of the turret [refer step 4 of FIG. 1]. The turret then rotates as described above whereby the second pharmaceutical powder is compressed over the first layer to form bi-layer tablets which are then pushed out of the die [refer steps 5-7 of FIG. 1], and then deflected through another take-off plate and discharge chute in the second half-side of the turret and collected in a container.

The entire operation of single and/or bi-layer tablet manufacturing is controlled through a control system, typically a programmable logic controller (PLC) system. The control system enables users to input parameters for controlling the manufacturing of the tablets, such as required weight, thickness, etc.

Both the single layer and bi-layer tablets are periodically sampled and checked for compliance with respect to the required weight, thickness and other quality parameters. In conventional sampling of bi-layer tablets, the weight of only the first layer of each tablet is checked while the weight of the second layer of each tablet is calculated by deducting the first layer weight from the average weight of all the bi-layer tablets. This implies that only the first layer of the bi-layer tablets is actually sampled, while the sampling of the second layer is based on assumption made by taking the average weight of all the bi-layer tablets.

Figure 2:
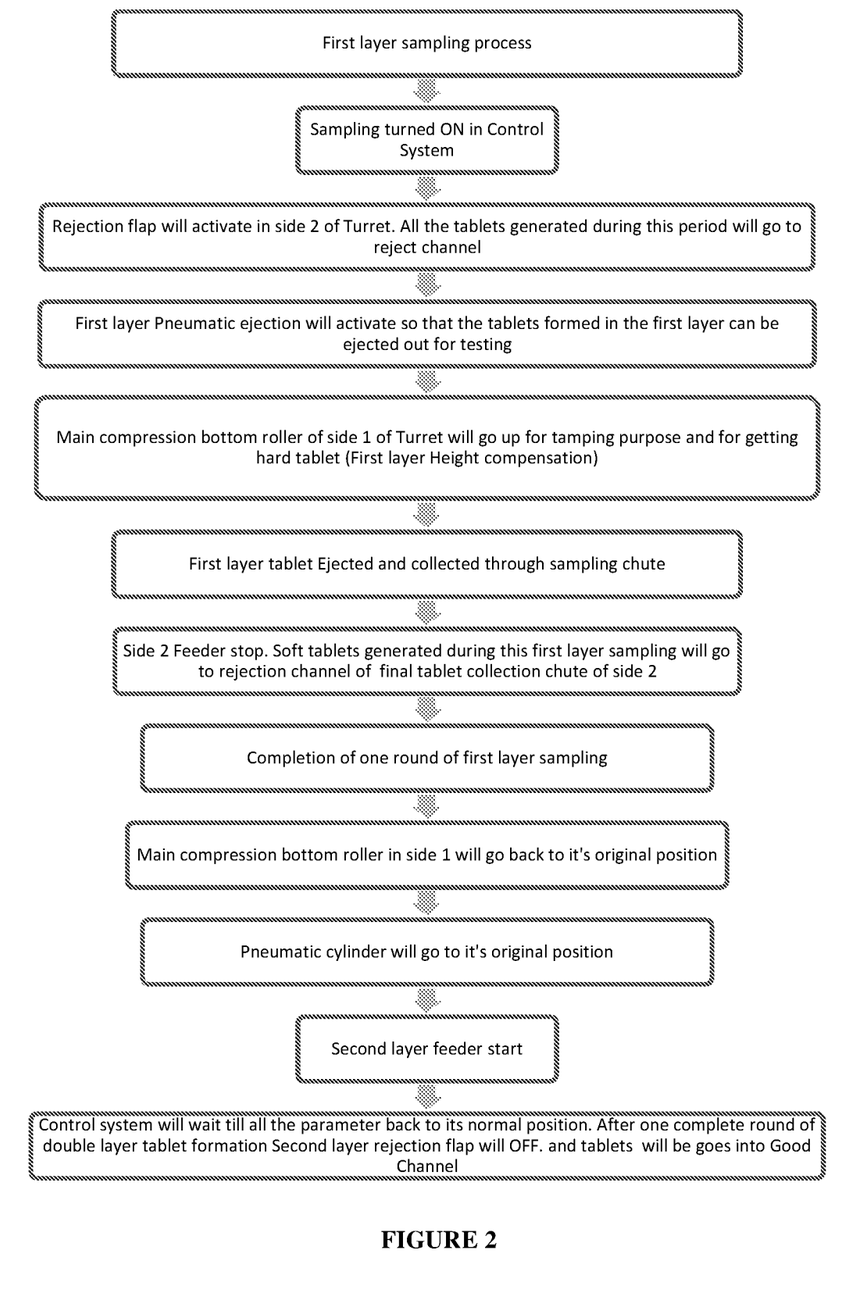
FIG. 2 illustrates a flow chart depicting the conventional method for sampling bi-layer tablets.

The conventional method for sampling bi-layer tablets involving only the first-layer sampling is depicted in the flow chart illustrated in FIG. 2. The sampling process is first turned ON through the control system. As the sampling process is turned ON, the rejection flap in the discharge chute in the second half-side of the turret is activated as all the tablets formed during this sampling time should go the reject channel and not go to the good channel. The pneumatic ejection assembly in the first-half side of the turret is then activated to eject the first layer tablets for sampling. Thereafter 'first layer height compensation' is carried out [refer step 3A of FIG. 1], wherein compression means comprising the lower main-compression roller in the first-half side of the turret is displaced upwards by a predetermined distance for lifting the lower punch upwards and compressing (i.e. tamping) the first pharmaceutical powder in the die and getting hardened first layer tablets, on the basis of a 'first layer height compensation' parameter inputted in the control system. In accordance with an exemplary non-limiting embodiment, the lower main-compression roller in the first-half side is displaced upwards by 0.5 mm. Accordingly, the actual thickness i.e. the cylindrical height of the first layer tablet is reduced by 0.5 mm in order to get the hardened first layer tablets.

As the pneumatic ejection assembly in the first-half side of the turret is activated, the hardened first layer tablets are then ejected and diverted to the sampling channel i.e. the reject channel in the discharge chute and collected in a sampling container [refer step 4A of FIG. 1]. At the same time, the feeding of the second pharmaceutical powder through the feeder in the second-half side of the turret is stopped, and soft second layer tablets formed during the sampling are deflected by a rejection flap through a rejection channel in a discharge chute in the second-half side of the turret and collected in a rejection container. After completion of one round of first layer sampling, the lower main-compression roller goes back to its original position and the pneumatic cylinder of the pneumatic ejection assembly goes back to its original position.

Thereafter, the second pharmaceutical powder is filled in the through-holes in each die through the feeder, to start bi-layer tablet pressing in the second-half side of the turret. The turret then rotates as described above. Initially, the rejection flap is activated/swung in the discharge chute in the second-half side of the turret and thereby all the bi-layer tablets initially formed in the machine will be rejected. After one complete round of bi-layer tablet formation the rejection flap is deactivated and a good collection flap in the second-half side of the turret is activated/swung to deflect the bi-layer tablets through a good tablet collection channel in the discharge chute and into the collection container [refer steps 4-7 of FIG. 1]. Finally, the weight of the first layer of each tablet available from the first layer sampling is checked, while the weight of the second layer of each tablet is calculated by deducting the first layer weight from the average weight of all the bi-layer tablets.

However, the conventional method for sampling bi-layer tablets shown in FIGS. 1 and 2, is inaccurate as it involves taking into consideration two different parameters viz. the weight of the first layer tablets and the average weight of all the bi-layer tablets. Moreover, the weight of the second layer of the tablets is not checked, rather, only an assumption is made about the second layer weight through the calculation, consequently leading to more inaccuracies in the sampling and failing in quality parameters. Additionally, soft tablets also cause sprinkling of the loosely bounded powder and layer mixing.

Figure 3:
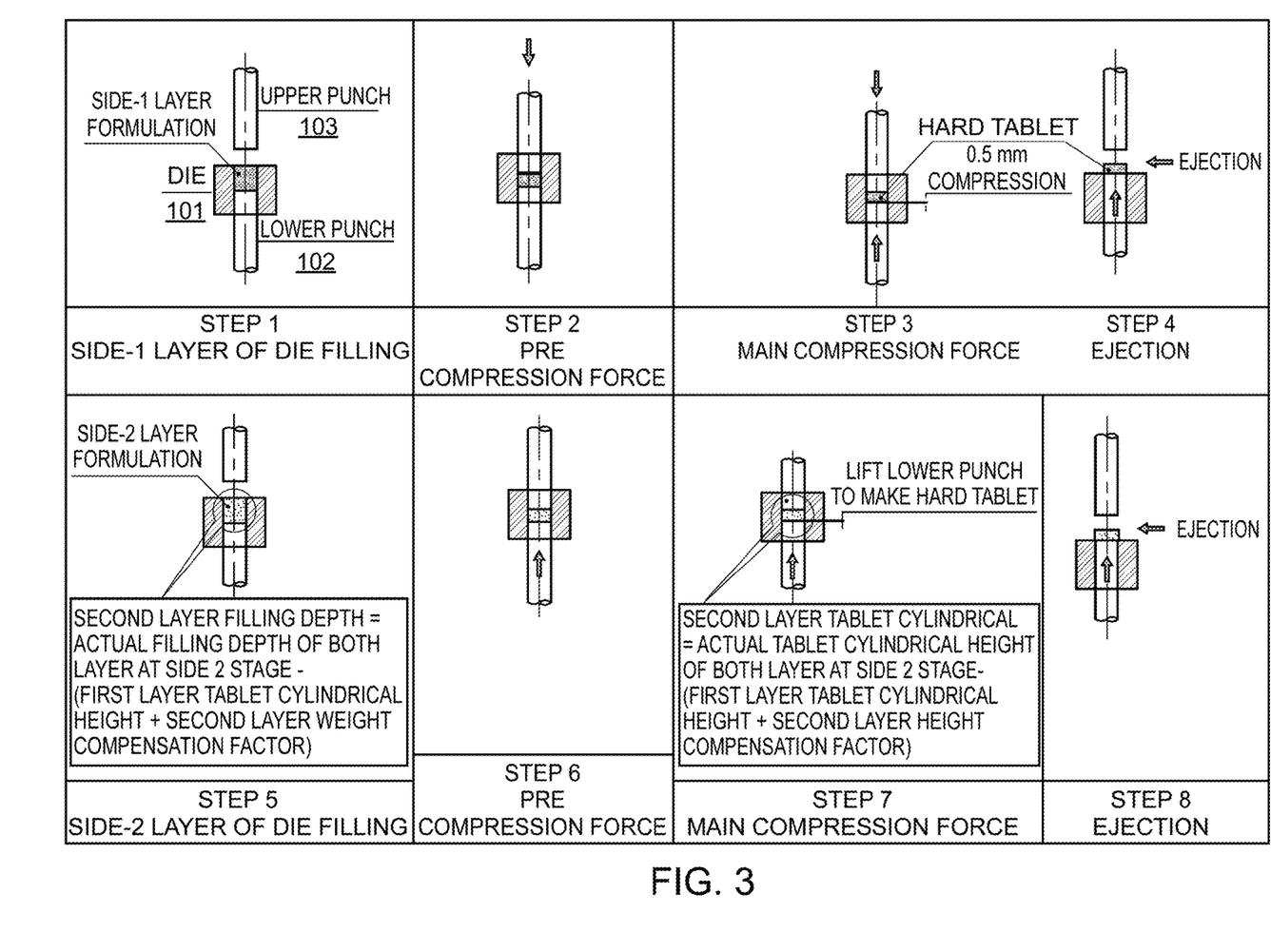
FIG. 3 illustrates schematic diagrams depicting sampling of both layers of bi-layer tablets in accordance with the present invention.
Figure 4:
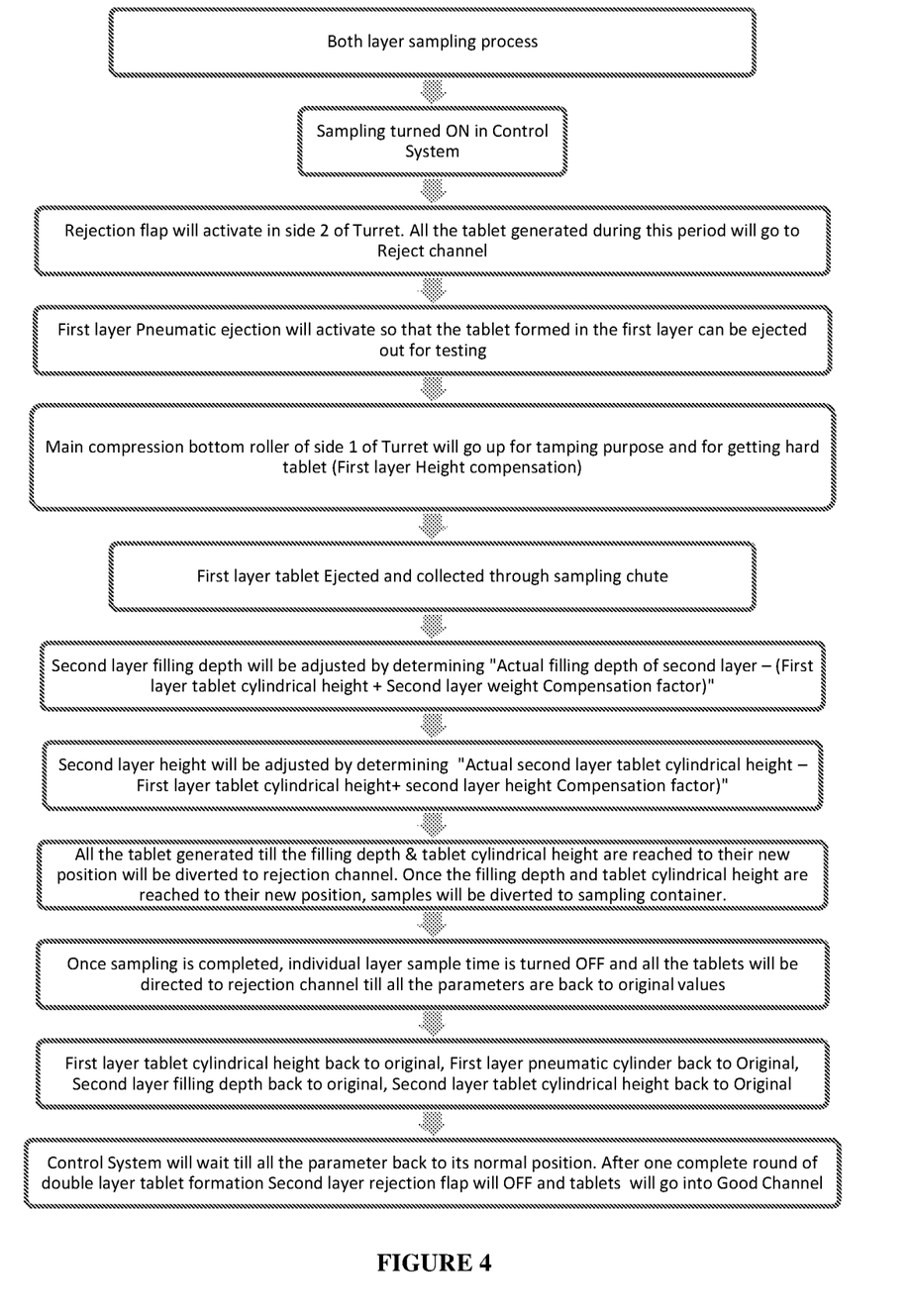
FIG. 4 illustrates a flow chart depicting the method for sampling of both layers of bi-layer tablets in accordance with the present invention.

The inaccuracies associated with conventional method for sampling bi-layer tablets as described above are overcome by the presently disclosed method for sampling both the layers of the bi-layer tablets as depicted in the flow chart illustrated in FIG. 4 and also the schematic diagram illustrated in FIG. 3. Referring to FIG. 4, the method involves carrying out first layer sampling including 'first layer height compensation' and ejection of the hardened first layer tablets of a first pharmaceutical powder from the first-half side of the turret of the tablet press machine in the same manner as the method illustrated in FIG. 2 [refer steps 1-4 of FIG. 3]. Simultaneously, second layer tablets of a second pharmaceutical powder are also formed in the second-half side of the turret through at least one revolution of the turret, and then weighed. Thereafter, the method involves carrying out 'second layer weight compensation' and 'second layer height compensation', based on the formed first layer tablets and a weight of the second layer tablets previously formed through at least one revolution of the turret, for second layer sampling. The 'second layer weight compensation' and 'second layer height compensation' is carried out typically by the control system [refer steps 5-8 of FIG. 3].

The first layer tablets can expand or contract after compression depending on the properties of the first pharmaceutical powder. Conventional tablet press machines cannot identify this expansion/contraction of the first layer tablets. The present invention overcomes this drawback through introduction of a weight compensation factor and a height compensation factor which eliminates the effect of expansion/contraction of the first layer tablets in order to get accurate weight and height of the bi-layer tablets. In an embodiment, the control system can be configured to enable the weight and height compensation factors to be fed manually in the control system through a user interface thereof. In another embodiment, the control system can be configured to automatically determine the weight and height compensation factors.

In 'second layer weight compensation', filling depth of the second pharmaceutical powder in the through-holes of the dies (101) i.e. a second layer filling depth is determined by deducting the sum of the first layer cylindrical height and a second layer weight compensation factor from an actual filling depth of the both layers in the die in the second-half side of the turret. Typically, the actual filling depth is the filling depth of both layers in the die during regular production of bi-layer tablets.

Second layer filling depth=Actual filling depth of both layers−(first layer tablet cylindrical height+ second layer weight compensation factor).

The second layer weight compensation factor corresponds to height variation in the second layer filling depth based on a weight of the previously formed second layer. In other words, the second layer weight compensation factor is a value by which the second layer filling depth in the dies (101) must be varied, which value depends on the weight of the previously formed second layer. The second layer weight compensation factor satisfies the following equation:

$$V=\pi r^2 h * BD,$$

where 'V' denotes the weight of the previously formed second layer,

'r' denotes the radius of the bi-layer tablet,

'h' denotes height variation in second layer filling depth, and

'BD' denotes Bulk Density of the previously formed second layer.

In order to carry out second layer weight compensation, the weight adjustment cam in the second-half side of the turret is displaced upwards or downwards by the distance of 'h' for sliding the lower punch (102) upwards or downwards to vary i.e. decrease or increase the second layer fill depth in each die (101) [refer step 5 of FIG. 3], when the turret rotates through a weight adjustment portion in the second-half side of the turret.

In the event that the weight of the previously formed second layer tablets is greater than a required weight of the second layer, the weight adjustment cam in the second-half side of the turret is displaced upwards by the distance of 'h' for sliding the lower punch (102) upwards to spill out excess powder from each die and reduce the second layer fill depth in each die (101). Here, the distance 'h' corresponds to height decrease in the second layer filling depth based on an additional weight of the previously formed second layer, by spilling out excess powder from each die.

In the event that the weight of the previously formed second layer tablets is lesser than a required weight of the second layer, the weight adjustment cam in the second-half side of the turret is displaced downwards by the distance of 'h' for sliding the lower punch (102) downwards to add excess powder in each die and increase the second layer fill depth in each die (101). Here, the distance 'h' corresponds to height increase in the second layer filling depth based on a reduced weight of the previously formed second layer, by adding excess powder in each die.

As the turret continues to rotate through a pre-compression portion in the second half-side of the turret, the upper punch (103) is pushed downwards in the through-hole of each die (101) by the upper pre-compression roller and the lower punch (102) in the through-hole in each die is also pushed upwards by the lower pre-compression roller to pre-compress the second pharmaceutical powder in each die (101) and form a weight compensated second layer in each die (101).

For example, in an exemplary non-limiting aspect, a bi-layer tablet may have diameter of 8 mm and dosage weight of 500 mg where weight of a first layer of a first pharmaceutical powder may require to be 300 mg and weight of a second layer of a second pharmaceutical powder may require to be 200 mg. Further, a filling depth for filling both the first and second pharmaceutical powders in a die of the tablet press machine may require to be 6 mm in order to get bi-layer tablets with 8 mm diameter and 500 mg weight. For both layer sampling, firstly, hardened first layer of the first pharmaceutical powder will be formed by carrying out 'first layer height compensation' as described above in the first-half side of the turret. Simultaneously, second layer tablets of the second pharmaceutical powder are also formed in the second-half side of the turret through at least one revolution of the turret, and then weighed. Let us assume that the hardened first layer tablets have a cylindrical height of 2 mm. Now 'second layer weight compensation' is carried out by determining a second layer filling depth.

Second layer filling depth=Actual filling depth of both layers−(first layer tablet cylindrical height+ second layer weight compensation factor).

Based on the above mentioned exemplary values, the second layer filling depth without second layer weight compensation factor will be (6−2=4 mm). However, if the weight of the previously formed second layer through at least one revolution of the turret, for example, is 201.6 mg instead of 200 mg, then second layer weight compensation factor comes into the action. The second layer weight compensation factor will now correspond to height decrease 'h' in the second layer filling depth based on additional weight of the previously formed second layer. Therefore, in order to reduce the additional 1.6 mg, height decrease 'h' in second layer filling depth must be determined i.e. a value by which the second layer filling depth is to be reduced must be determined.

Applying $V=\pi r^2 h * BD$, $$V=3.141*4^2*4*0.5=201.6 \text{ Mg.}$$

However, in order to get precise 200 mg the weight compensation factor i.e. height decrease 'h' in second layer filling depth must be determined to reduce the additional 1.6 mg.

height decrease, $h=V/(\pi r^2 * BD)=$ 1.6/(3.141*4^2*0.5)=0.064, or $$V=3.141*4^2*0.064*0.5=1.6 \text{ Mg.}$$

Therefore, the second layer filling depth= 6−(2+0.064)=3.936 where in 0.064 is the second layer weight compensation factor. The weight adjustment cam in the second-half side of the turret is displaced upwards by a distance of 0.064 mm for lifting the lower punch (102) upwards to spill out excess powder from each die (101) and reduce the second layer fill depth in each die (101) [refer step 5 of FIG. 3].

Thereafter, the upper punch (103) is pushed downwards in the through-hole of each die (101) by the upper pre-compression roller and the lower punch (102) in the through-hole in each die is also pushed upwards by the lower pre-compression roller to pre-compress the second pharmaceutical powder in each die (101) and form weight compensated second layer in each die (101) [refer step 6 of FIG. 3].

Thereafter, 'second layer height compensation' is carried out. In second layer height compensation, second layer cylindrical height of weight compensated second layer tablets is determined by deducting the sum of the first layer tablet cylindrical height and a second layer height compensation factor from an actual second layer tablet cylindrical height in the second-half side of the turret. Typically, the actual cylindrical height is the cylindrical height of the second layer in the die during regular production of the bi-layer tablets.

> Second layer cylindrical height=Actual both layer tablet cylindrical height−(first layer tablet cylindrical height+second layer height compensation factor).

The second layer height compensation factor corresponds to reduction in the cylindrical height of the weight compensated second layer to form hardened second layer. In other words, the second layer height compensation factor is a value by which the height of weight compensated second layer in the die (101) must be reduced to form hardened second layer tablets. In order to carry out second layer height compensation, the compression means comprising the lower main-compression roller in the second-half side of the turret is displaced upwards by a distance based on the determined second layer cylindrical height for lifting the lower punch upwards, and the upper main-compression roller pushes the upper punch (103) further down in the through-hole in the die (101) to fully compress the second pharmaceutical powder in the die (101) and form a hardened second layer tablet in the die (101) [refer step 7 of FIG. 3], when the turret rotates through a main-compression portion in the second-half side of the turret.

For example, in accordance with the above mentioned exemplary non-limiting aspect, the cylindrical height of hardened first layer tablets is 2 mm, and it is desired to have cylindrical height of hardened second layer tablets as 4 mm. Now 'second layer height compensation' is carried out by determining the second layer cylindrical height of the weight compensated second layer tablets.

> Second layer cylindrical height=Actual both layer tablet cylindrical height−(first layer tablet cylindrical height+second layer height compensation factor).

Based on the above mentioned exemplary values, the second layer cylindrical height without second layer height compensation factor will be (4−2=2 mm). However, by keeping 2 mm a soft/fragile second layer tablet may be formed which cannot be held or cannot be weighed whereby the second layer height compensation factor comes into the action. The second layer height compensation factor corresponds to reduction in the cylindrical height of the weight compensated second layer to get hardened second layer tablet. Therefore, in order to get hardened second layer tablet, a value by which the height of weight compensated second layer in the die (101) is to be reduced must be determined.

Therefore, the second layer cylindrical height=4−(2+0.01)=1.99 wherein 0.01 is assumed to be the second layer height compensation factor. The compression means comprising the lower main-compression roller in the second-half side of the turret is displaced upwards by a distance of 0.01 mm for lifting the lower punch upwards, and the upper main-compression roller pushes the upper punch (103) further down in the through-hole in the die (101) to fully compress the second pharmaceutical powder in the die (101) and form a hardened second layer tablet in the die (101) [refer step 7 of FIG. 3]. It may be appreciated that the second layer height compensation factor is not limited to the assumed value of 0.01, and that the second layer height compensation factor can be assumed to be of any other value depending on the weight compensated second layer tablet and the required dosage of the bi-layer tablet, whereby the compression means comprising the lower main-compression roller in the second-half side of the turret would be displaced upwards by a distance corresponding to the assumed value for lifting the lower punch upwards. It may also be appreciated that the second layer height compensation factor may also be zero or may not be required to be determined at all in conditions where the weight compensated second layer tablets are sufficient to meet the required dosage of the bi-layer tablets, whereby the compression means comprising the lower main-compression roller in the second-half side of the turret would be in its original position.

Thus, by introducing the second layer weight compensation factor of 0.064 and the second layer height compensation factor of 0.01, hardened second layer tablet having precise 200 mg weight is achieved.

After determining 'second layer weight compensation' and 'second layer height compensation', initially, all the second layer tablets formed in the second-half side of the turret will be diverted through the rejection channel in the discharge chute in the second-half side of the turret into the rejection container, till the value of the second layer filling depth and tablet cylindrical height is reached.

Once the second layer tablets as per the second layer filling depth and second layer tablet cylindrical height are formed, the second layer tablets are diverted into the sampling container. This completes the second-layer sampling [refer steps 5-8 in FIG. 3]. Thus, in accordance with the presently disclosed method as shown in FIGS. 3 and 4, both the layers of the bi-layer tablets are sampled.

After both layer sampling is carried out, bi-layer tablet pressing is continued. The turret continues to rotate as described above. Initially, the rejection flaps are activated/swung in the discharge chute in both the first-half and second-half sides of the turret and thereby all the bi-layer tablets initially formed in the machine will be rejected. The control system then operates to bring the first layer tablet cylindrical height, the second layer filling depth and the second layer tablet cylindrical height back to the original values as per requirement. The lower main-compression rollers in the second-half side and first-half side of the turret go back to their original position. The pneumatic cylinder in the first-half side of the turret goes back to its original position.

After one complete round of bi-layer tablet formation the rejection flaps are deactivated and the good collection flaps in the second-half side of the turret are activated/swung to deflect the bi-layer tablets through the good tablet collection channels in the discharge chute into the collection container.

Thus, in accordance with the present invention, the method for sampling both layers of a bi-layer tablet comprises:
 forming a first layer of a first pharmaceutical powder of the bi-layer tablet in a tablet press machine;
 performing weight compensation for forming a second layer of a second pharmaceutical powder of the bi-layer tablet based at least on the formed first layer;

performing height compensation for forming the second layer of the second pharmaceutical powder of the bi-layer tablet based at least on the formed first layer; and forming the second layer of the bi-layer tablet based on the performed height compensation and weight compensation, in the tablet press machine, for individually sampling both the first and second layers of the bi-layer tablet.

In accordance with the method, the step of forming the first layer of the bi-layer tablet includes performing height compensation for forming the first layer.

In accordance with the method, the step of performing height compensation for forming the first layer comprises displacing a compression means of the tablet press machine by a predetermined distance to form a hardened first layer in a die of the tablet press machine.

In accordance with the method, wherein the step of performing weight compensation for forming the second layer comprises determining a second layer filling depth for filling the second pharmaceutical powder in a die of the tablet pressing machine and displacing a weight adjustment cam of the tablet press machine by a distance based on the determined second layer filling depth to form a weight compensated second layer in the die of the tablet press machine.

In accordance with the method, the step of determining the second layer filling depth comprises deducting sum of a cylindrical height of the formed first layer and a second layer weight compensation factor, from an actual filling depth of the both the first and second layers in the die.

In accordance with the method, the second layer weight compensation factor corresponds to height variation in the second layer filling depth based on a weight of a previously formed second layer, and satisfies the equation $V=\pi r^2 h*BD$, where 'V' denotes the weight of the previously formed second layer, 'r' denotes the radius of the bi-layer tablet, 'h' denotes height variation in second layer filling depth, and 'BD' denotes Bulk Density of the previously formed second layer.

In accordance with the method, the actual filling depth is the filling depth of both layers in the die during production of the bi-layer tablets.

In accordance with the method, the step of performing height compensation for forming the second layer comprises determining a cylindrical height for the weight compensated second layer of the bi-layer tablet and displacing a compression means of the tablet press machine by a distance based on the determined cylindrical height for the weight compensated second layer to form a hardened second layer in the die of the tablet press machine.

In accordance with the method, the step of determining the cylindrical height of the second layer comprises deducting sum of the cylindrical height of the formed first layer and a second layer height compensation factor, from an actual cylindrical height of the both the first and second layers in the die.

In accordance with the method, the second layer height compensation factor corresponds to reduction in the cylindrical height of the weight compensated second layer to form the hardened second layer.

In accordance with the method, the actual cylindrical height is the cylindrical height of the second layer in the die during production of the bi-layer tablets.

The method for sampling both layers of a bi-layer tablet is implemented typically by a control system associated with the tablet press machine. The control system for sampling both layers of the bi-layer tablet is configured to operate the tablet press machine to form a first layer of a first pharmaceutical powder of the bi-layer tablet in the tablet press machine. The control system is further configured to perform weight compensation to form a second layer of a second pharmaceutical powder of the bi-layer tablet based at least on the formed first layer, and further perform height compensation to form the second layer of the second pharmaceutical powder of the bi-layer tablet based at least on the formed first layer. A weight compensation factor and a height compensation factor can be fed manually in the control system or can be automatically determined by the control system. The control system is further configured to operate the tablet press machine to form the second layer of the bi-layer tablet based on the performed height compensation and weight compensation, in the tablet press machine, for individually sampling both the first and second layers of the bi-layer tablet.

The control system is further configured to perform height compensation to form the first layer of the bi-layer tablet.

The control system, to perform height compensation to form the first layer, is configured to displace a compression means of the tablet press machine by a predetermined distance to form a hardened first layer in a die of the tablet press machine.

The control system, to perform weight compensation to form the second layer, is configured to determine a second layer filling depth for filling the second pharmaceutical powder in a die of the tablet press machine and displace a weight adjustment cam of the tablet press machine by a distance based on the determined second layer filling depth to form a weight compensated second layer in the die of the tablet press machine.

The control system, to determine the second layer filling depth, is further configured to deduct sum of a cylindrical height of the formed first layer and a second layer weight compensation factor, from an actual filling depth of the both the first and second layers in the die.

The control system is further configured to compute the second layer weight compensation factor corresponding to height variation in the second layer filling depth based on a weight of a previously formed second layer and satisfying the equation $V=\pi r^2 h*BD$, where 'V' denotes the additional weight of the previously formed second layer, 'r' denotes the radius of the bi-layer tablet, 'h' denotes height variation in second layer filling depth, and 'BD' denotes Bulk Density of the previously formed second layer. The control system is also configured to receive the second layer weight compensation factor fed manually therein through a user interface thereof.

The control system is configured to record the actual filling depth as the filling depth of both layers in the die during production of the bi-layer tablets.

The control system, to perform height compensation to form the second layer, is configured to determine a cylindrical height for the weight compensated second layer of the bi-layer tablet and displace a compression means of the tablet press machine by a distance based on the determined cylindrical height for the weight compensated second layer to form a hardened second layer in the die of the tablet press machine.

The control system, to determine the cylindrical height of the second layer, is configured deduct sum of the cylindrical height of the formed first layer and a second layer height compensation factor, from an actual cylindrical height of the both the first and second layers in the die.

The control system is configured to compute the second layer height compensation factor corresponding to reduction in the cylindrical height of the second layer to form the hardened second layer. The control system is also configured to receive the second layer height compensation factor fed manually therein through the user interface thereof.

The control system is configured to record the actual cylindrical height as the cylindrical height of the second layer in the die during production of the bi-layer tablets.

In exemplary embodiments, the control system may include at least one or more processing devices, one or more memory devices, one or more power supply devices, one or more input/output or user interfaces, one or more communication devices, and the like, in communication with each other or at least some of the devices to enable the operation of the control system.

The processing device(s) may typically be configured to control the operations of the tablet press machine including implementing the method for sampling both layers of a bi-layer tablet described herein above. The processing device(s) may include one or more modules/units to facilitate controlling the operations of the tablet press machine including implementation of the method for sampling both layers of a bi-layer tablet. The processing device(s) may be devices such as programmable logic controller(s) (PLCs), microcontroller(s), microprocessor(s), digital signal processor(s) (DSPs), field programmable gate array(s) (FPGAs), application specific integrated circuit(s) (ASICs) or other like electronic processing devices.

The memory devices(s) typically in communication with the processing device(s), may be configured to store various types of data to support the operation of the control system, which data may include the above described weight and height compensation factors, actual filling depth, actual cylindrical height, and instructions for implementing the method for sampling both layers of a bi-layer tablet. The memory devices may include any type of volatile or non-volatile memory devices, or a combination thereof, such as static random access memory (SRAM), electrically erasable programmable read-only memory (EEPROM), erasable programmable read-only memory (EPROM), programmable read-only memory (PROM), read-only memory (ROM), flash memory, magnetic memory, and the like.

The power supply devices provide power to the control system and the tablet press machine. The power supply devices may include power management system(s), one or more power sources, and any other components associated with the generation, management, and distribution of power to the control system and the tablet press machine.

The user interfaces may include touchscreen display(s), keyboard, mouse, and the like, to enable users to operate the tablet press machine through the control system either in a manual mode or an automated mode.

The communication devices may be configured to facilitate wired and/or wireless communication between the control system and the tablet press machine. In exemplary embodiments, the communication devices may also be configured to facilitate wired and/or wireless communication between the control system and external terminals including remote terminals.

The method and system for sampling layers of bi-layer tablets as described herein above overcomes the drawbacks and inaccuracies associated with conventional bi-layer tablet sampling methods and enables accurate sampling of each layer of bi-layer tablets individually.

The foregoing description has been set merely to illustrate the invention and is not intended to be limiting. Since modifications of the disclosed embodiments incorporating the substance of the invention may occur to person skilled in the art, the invention should be construed to include everything within the scope of the invention.

The invention claimed is:

1. A method for sampling both layers of a bi-layer tablet, the method comprising:
   forming a first layer of a first pharmaceutical powder of the bi-layer tablet in a tablet press machine;
   performing weight compensation for forming a second layer of a second pharmaceutical powder of the bi-layer tablet based at least on the formed first layer;
   performing height compensation for forming the second layer of the second pharmaceutical powder of the bi-layer tablet based at least on the formed first layer, wherein the step of performing height compensation comprises:
   (i) determining a cylindrical height for the weight compensated second layer of the bi-layer tablet, wherein the step of determining the cylindrical height of the second layer comprises deducting sum of the cylindrical height of the formed first layer and a second layer height compensation factor, from an actual cylindrical height of the both the first and second layers in the die; and
   (ii) displacing a compression means of the tablet press machine by a distance based on the determined cylindrical height for the weight compensated second layer to form a hardened second layer in the die of the tablet press machine; and
   forming the second layer of the bi-layer tablet based on the performed height compensation and weight compensation, in the tablet press machine, for individually sampling both the first and second layers of the bi-layer tablet.

2. The method as claimed in claim 1, wherein the step of forming the first layer of the bi-layer tablet includes performing height compensation for forming the first layer.

3. The method as claimed in claim 1, wherein the step of performing weight compensation for forming the second layer comprises determining a second layer filling depth for filling the second pharmaceutical powder in a die of the tablet press machine, and displacing a weight adjustment cam of the tablet press machine by a distance based on the determined second layer filling depth to form a weight compensated second layer in the die of the tablet press machine.

4. The method as claimed in claim 3, wherein the step of determining the second layer filling depth comprises deducting sum of a cylindrical height of the formed first layer and a second layer weight compensation factor, from an actual filling depth of the both the first and second layers in the die.

5. The method as claimed in claim 4, wherein the second layer weight compensation factor corresponds to height variation in the second layer filling depth based on a weight of a previously formed second layer, and satisfies the equation $V=\pi r^2 h*BD$,
   where 'V' denotes the weight of the previously formed second layer,
   'r' denotes the radius of the bi-layer tablet,
   'h' denotes height variation in second layer filling depth, and
   'BD' denotes Bulk Density of the previously formed second layer.

6. The method as claimed in claim 4, wherein the actual filling depth is the filling depth of both layers in the die during production of the bi-layer tablets.

7. The method as claimed in claim 1, wherein the second layer height compensation factor corresponds to reduction in the cylindrical height of the weight compensated second layer to form the hardened second layer.

8. The method as claimed in claim 1, wherein the actual cylindrical height is the cylindrical height of the second layer in the die during production of the bi-layer tablets.

\* \* \* \* \*